(12) United States Patent
Garrett et al.

(10) Patent No.: US 9,398,598 B2
(45) Date of Patent: Jul. 19, 2016

(54) OVERALL MU-MIMO CAPACITY FOR USERS WITH UNEQUAL PACKET LENGTHS IN AN MU-MIMO FRAME

(71) Applicant: Broadcom Corporation, Irvine, CA (US)

(72) Inventors: David Garrett, Tustin, CA (US); Jun Zheng, San Diego, CA (US); Nihar Jindal, San Mateo, CA (US)

(73) Assignee: BROADCOM CORPORATION, Irvine, CA (US)

( * ) Notice: Subject to any disclaimer, the term of this patent is extended or adjusted under 35 U.S.C. 154(b) by 138 days.

(21) Appl. No.: 14/262,328

(22) Filed: Apr. 25, 2014

(65) Prior Publication Data

US 2015/0237639 A1    Aug. 20, 2015

Related U.S. Application Data

(60) Provisional application No. 61/940,175, filed on Feb. 14, 2014.

(51) Int. Cl.
*H04W 72/08* (2009.01)
*H04W 52/24* (2009.01)

(52) U.S. Cl.
CPC .......... *H04W 72/085* (2013.01); *H04W 52/241* (2013.01)

(58) Field of Classification Search
CPC .... H04L 1/0025; H04B 7/0417; H04B 7/063; H04B 7/0669; H04B 7/068
See application file for complete search history.

(56) References Cited

U.S. PATENT DOCUMENTS

| 6,721,302 | B1 | 4/2004 | Alastalo |
| 8,363,634 | B2 * | 1/2013 | Yamamoto ........ H04W 72/1263 370/345 |
| 8,462,653 | B2 * | 6/2013 | Medvedev ............ H04L 1/0002 370/236 |
| 2012/0002652 | A1 | 1/2012 | Uln et al. |

FOREIGN PATENT DOCUMENTS

EP    1865672    12/2007

OTHER PUBLICATIONS

European Search Report for EP Application No. 15000323 mailed May 4, 2015.

* cited by examiner

*Primary Examiner* — Chandrahas Patel
(74) *Attorney, Agent, or Firm* — Foley & Lardner LLP; Christopher J. McKenna; Paul M. H. Pua

(57) ABSTRACT

In some aspects, the disclosure is directed to methods and systems for transmitting packets (including but not limited to MU-MIMO packets). An access point communicating wirelessly with a plurality of devices can determine that a first packet for a first device of the plurality of devices has a first transmission duration. The access point can determine that a second packet for a second device of the plurality of devices has a second transmission duration shorter than the first transmission duration. The access point can adjust, based on the determination, a transmission power or a modulation and coding scheme to transmit the second packet during a third transmission duration. The third transmission duration can be greater than the second transmission duration.

20 Claims, 6 Drawing Sheets

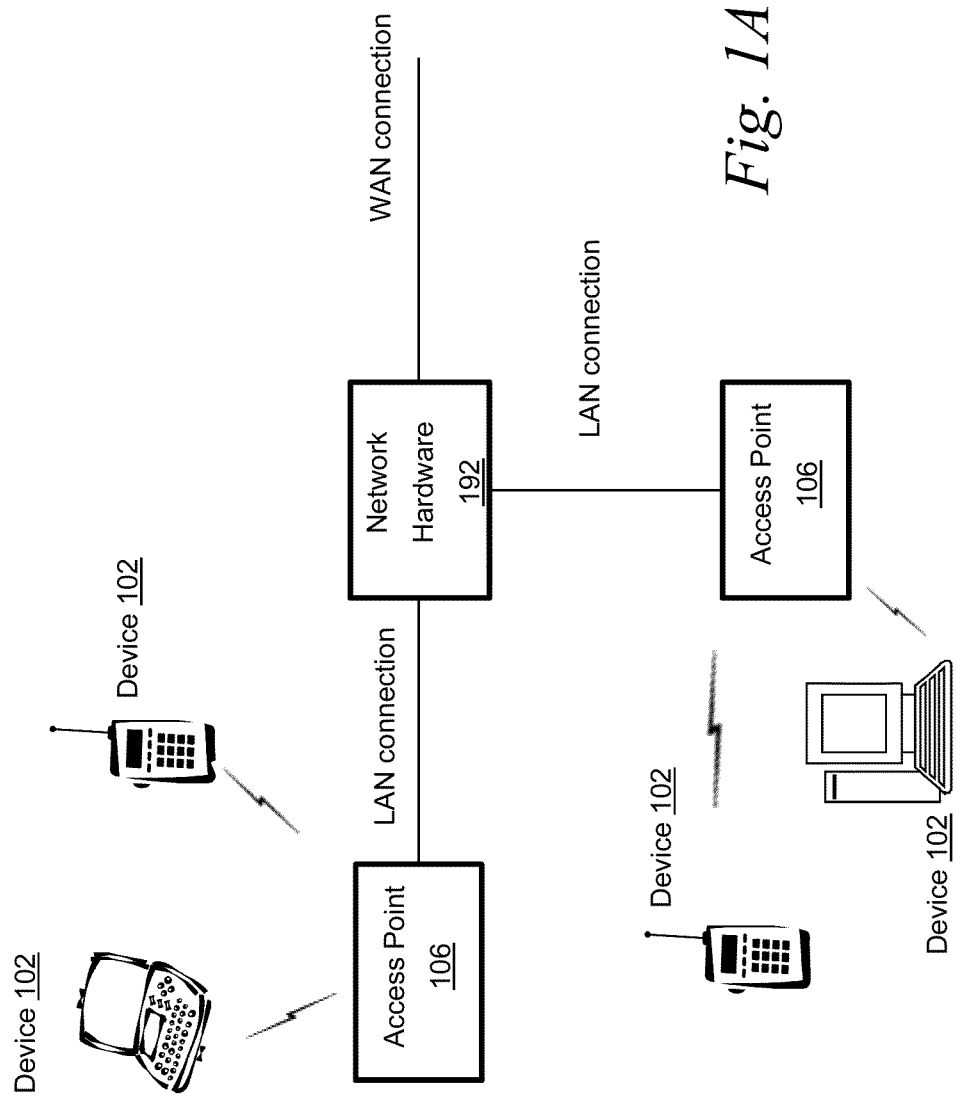

OVERALL MU-MIMO CAPACITY FOR USERS WITH UNEQUAL PACKET LENGTHS IN AN MU-MIMO FRAME

CROSS REFERENCE TO RELATED APPLICATIONS

This application claims the benefit of and priority to U.S. Provisional Application No. 61/940,175, filed Feb. 14, 2014, entitled "METHODS AND SYSTEMS FOR IMPROVING OVERALL MU-MIMO CAPACITY FOR USERS WITH UNEQUAL PACKET LENGTHS IN AN MU-MIMO FRAME", assigned to the assignee of this application, and which is incorporated herein by reference for all purposes in its entirety.

FIELD OF THE DISCLOSURE

This disclosure generally relates to systems and methods for improving capacity of a communications system. In particular, this disclosure relates to systems and methods for improving overall capacity for communications with unequal packet lengths in a frame by adjusting transmission characteristics.

The details of various embodiments of the methods and systems are set forth in the accompanying drawings and the description below.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and RF circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As higher data throughput and other changes develop, newer standards are constantly being developed for adoption, such as a progression from IEEE 802.11n to IEEE 802.11ac.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 1A is a block diagram depicting an embodiment of a network environment including one or access points in communication with one or more devices or stations (STAs);

DETAILED DESCRIPTION

The following IEEE standard(s), including any draft standard(s), are hereby incorporated herein by reference in their entirety and are made part of the present U.S. Utility Patent Application for all purposes: IEEE P802.11n™; and IEEE P802.11ac™. Although this disclosure can reference aspects of these standard(s), the disclosure is in no way limited by these standard(s).

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for improving overall multi-user multiple-input and multiple-output (MU-MIMO) capacity for users with unequal packet lengths in an MU-MIMO frame by adjusting transmission power and/or a modulation and coding scheme (MCS) between the users.

A. Computing and Network Environment

Figure 1B:
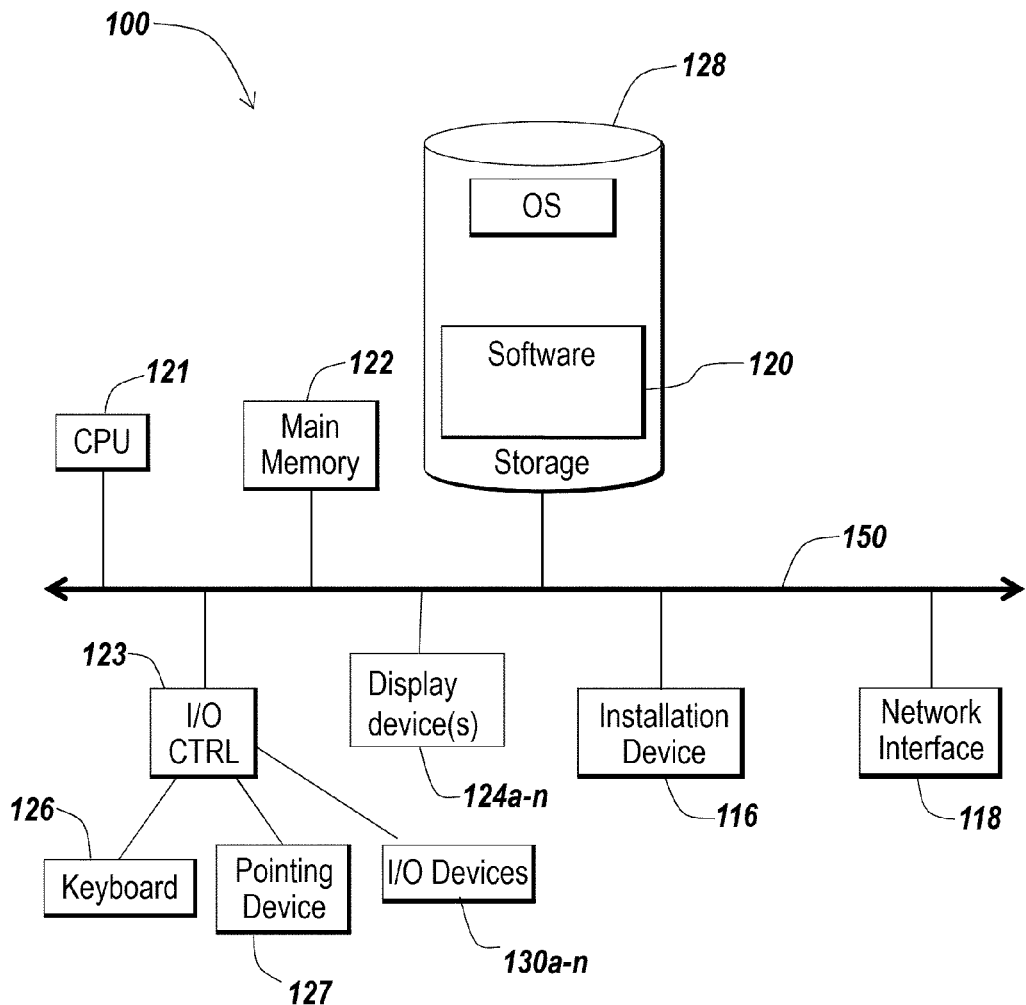
FIGS. 1B and 1C are block diagrams depicting embodiments of computing devices useful in connection with the methods and systems described herein.

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or access point are described in greater detail with reference to FIGS. 1B and 1C. The network environment can be an ad hoc network environment, an infrastructure wireless network environment, a subnet environment, etc., in one embodiment.

The access points (APs) 106 can be operably coupled to the network hardware 192 via local area network connections. The network hardware 192, which can include a router, gateway, switch, bridge, modem, system controller, appliance, etc., can provide a local area network connection for the communication system. Each of the access points 106 can have an associated antenna or an antenna array to communicate with the wireless communication devices in its area. The wireless communication devices can register with a particular access point 106 to receive services from the communication system (e.g., via a SU-MIMO or MU-MIMO configuration). For direct connections (i.e., point-to-point communications), some wireless communication devices can communicate directly via an allocated channel and communications protocol. Some of the wireless communication devices 102 can be mobile or relatively static with respect to the access point 106.

In some embodiments an access point 106 comprises a device or module (including a combination of hardware and software) that allows wireless communication devices 102 to connect to a wired network using Wi-Fi, or other standards.

An access point 106 can sometimes be referred to as an wireless access point (WAP). An access point 106 can be designed and/or built for operating in a wireless local area network (WLAN). An access point can connect to a router (e.g., via a wired network) as a standalone device in some embodiments. In other embodiments, an access point can be a component of a router. An access point can provide multiple devices access to a network. An access point can, for example, connect to a wired Ethernet connection and provides wireless connections using radio frequency links for other devices 102 to utilize that wired connection. An access point can be built and/or designed to support a standard for sending and receiving data using one or more radio frequencies. Those standards, and the frequencies they use can be defined by the IEEE (e.g., IEEE 802.11 standards). An access point can be implemented and/or used to support public Internet hotspots, and/or on an internal network to extend the network's Wi-Fi signal range.

In some embodiments, the access points 106 can be used for in-home or in-building wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more access points.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1C:
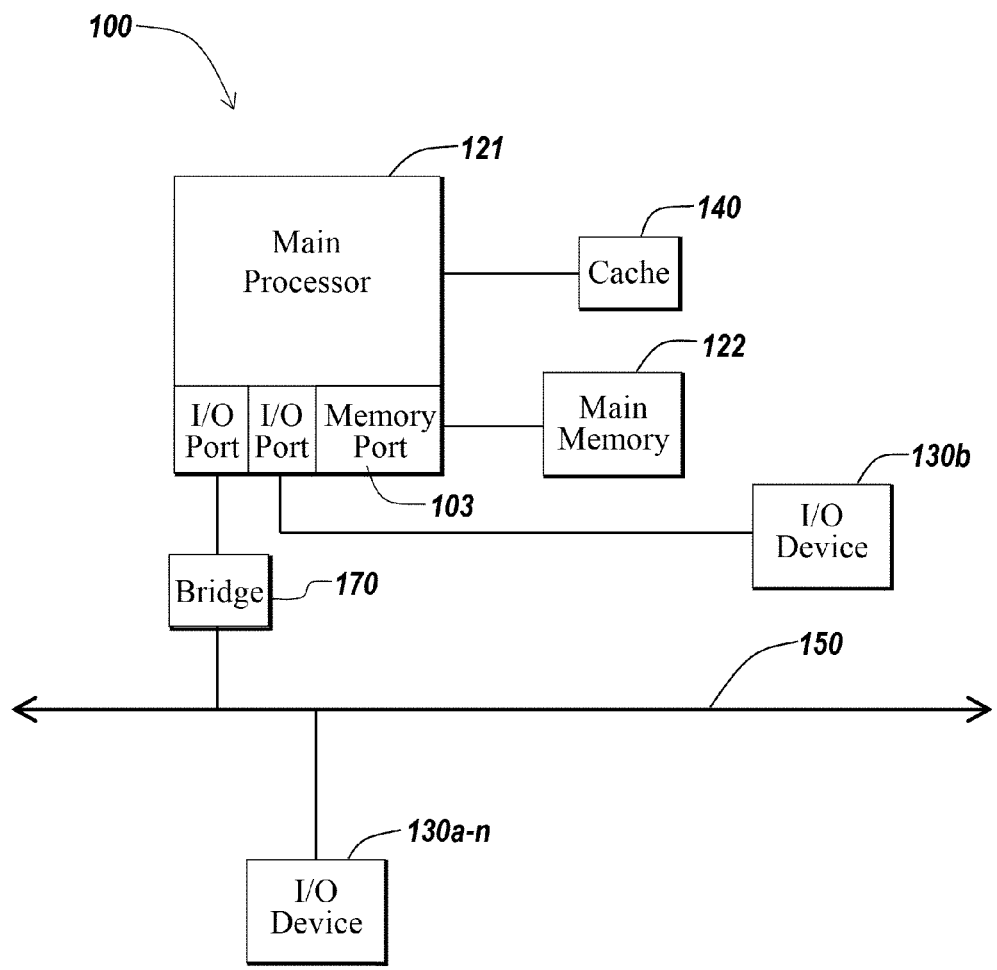

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the user device 102 or access point 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., software 120 implemented, designed and/or customized for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11 ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can comprise or be connected to one or more display devices 124a-124n. As such, any of the I/O devices 130a-130n and/or the I/O controller 123 can comprise any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can comprise multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can support or use multiple displays 124a-124n. One ordinarily skilled in the art will recognize and appreciate the various ways and embodiments that a computing device 100 can support or use one or more display devices 124a-124n.

In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computing device 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Improving Overall MU-MIMO Capacity for Users with Unequal Packet Lengths in an MU-MIMO Frame Described herein are systems and methods for improving the allocation of an access point's (AP's) transmission resources between users/stations 102 with unequal packet lengths in an MU-MIMO frame. In a MU-MIMO configuration with N number of STAs, an AP 106 can have certain amounts of data to send to each of the N STAs. For example, the AP can have a first number of bits to send to a first STA, and a second number of bits to send to a second STA, etc. Different amounts of data between STAs can translate to unequal packet lengths in an MU-MIMO frame. In some embodiments, an access point can append, prepend, lengthen, pad or otherwise extend a shorter packet with dummy data in each MU-MIMO frame to achieve equal packet length and equal transmission time between users, and to keep a same level of interference. The use of dummy data can result in transmission inefficiency by wasting over-the-air resources, for example. In other embodiments, an access point can shorten some packets to match a shortest packet length amongst the devices. In other embodiments, an access point can improve power allocation between STAs and/or the MCS for each STA. Shortening packets for inclusion in MU-MIMO frames can result in transmission inefficiency because of protocol overhead.

Instead of padding a shorter packet with dummy data or shortening packets, an access point can allocate transmission resources between devices to improve overall MU-MIMO capacity. This allocation process can be based on knowledge of the SNR of each STA and/or past history of packet success/failure to each STA, and can shorten or reduce the length of the MU frame between the users. The length can be determined based on a STA for which ratio of the number of bits, to the rate of MCS applied to that STA, is largest amongst the N STAs/users.

Allocation and/or re-allocation of transmission resources based on SNR differences between users or STAs can improve the overall performance across users or STAs, and can address the equal transmission time length requirement for MU-MIMO frames at the same time. The transmission resources can include transmission power and MCS/data-rate that an AP can assign to packets of different users/STAs. Thus, in particular embodiments of the present methods and systems, the AP can trade any excess signal-to-noise ratio (SNR) in a shorter packet by performing one or more of: reducing power for transmitting the shorter packet, re-allocate more power to transmit the longer packet, lower the Modulation and Coding Scheme index value and/or data transmission rate of the shorter packet, and increase the MCS and/or data transmission rate of the longer packet. The transmission length/time of the shorter packet can be increased (without padding) by the AP to match the transmission length/time of the longer packet, so as to achieve equal packet length between users. The AP can monitor feedback reports of estimated SNRs to re-allocate more transmission resources to, and increase the performance of a user/STA having more traffic. This can avoid inefficiencies from the alternative method of padding packets to match packet lengths.

The term packet as used herein broadly refers to an amount of data or content for communication between access points and devices, between access points, or between devices. The term packet can refer to per user data or content data in certain embodiments. The term packet can refer to but is not limited to a physical service data unit (PSDU) passed down from a MAC layer in certain embodiments. The term packet can refer to data for a particular device or user in certain embodiments. Details related to the term packet associated with the various communication standards (e.g., 802.11, LTE, etc.) should not be incorporated into the term packet as used herein.

In one aspect, this disclosure is directed to a method for transmitting packets. The method can include determining, by an access point communicating wirelessly with a plurality of devices, that a first packet or content for a first device of the plurality of devices has a first transmission duration. The access point can determine that a second packet or content for a second device of the plurality of devices has a second transmission duration shorter than the first transmission duration. The access point can adjust, based on the determination, a modulation and coding scheme to transmit the second packet during a third transmission duration. The third transmission duration can be greater than the second transmission duration.

In some embodiments, the access point can re-allocate transmission resources between the first device and the second device based at least on one or both of: a signal-to-noise ratio reported by the first device, and a signal-to-noise ratio reported by the second device. The access point can change or adjust, for a certain device, from a first MCS to a second MCS. The second MCS can support a data rate that is lower than that supported by the first MCS. The access point can compare a signal-to-noise ratio reported by the first device to a signal-to-noise ratio reported by the second device. The access point can reduce a transmission power of the access point for a device (e.g., the second device) based at least on the signal-to-noise ratio comparison. The access point can increase a transmission power of the access point for a device (e.g., the first device) based on the transmission power reduction for a different device (e.g., the second device). The access point can change a MCS for a device (e.g., the first device) based on the signal-to-noise ratio comparison. In some embodiments, the third transmission duration is equal to the first transmission duration.

In another aspect, the present disclosure is directed to a method for transmitting packets. The method can include determining, by an access point 106 communicating wirelessly with a plurality of devices 102, that a first packet for a first device of the plurality of devices has a first transmission duration. The access point can determine that a second packet for a second device of the plurality of devices has a second transmission duration shorter than the first transmission duration. The access point can adjust, based on the determination, a number of spatial streams or a transmission power of the access point to transmit the second packet during a third transmission duration. The third transmission duration can be greater than the second transmission duration.

In certain embodiments, the access point 106 can re-allocate transmission resources between the first device and the second device based at least on one or both of: a signal-to-noise ratio reported by the first device, and a signal-to-noise ratio reported by the second device. The access point can reduce the transmission power to transmit the second packet. The access point can increase a transmission power of the access point for the first device based on the reduction of the transmission power to transmit the second packet. The access point can compare a signal-to-noise ratio reported by the first device to a signal-to-noise ratio reported by the second device. The access point can change a modulation and coding scheme to transmit a packet (e.g., the second packet) based at least on the signal-to-noise ratio comparison. The access point can change a MCS for a device (e.g., the first device) based on the signal-to-noise ratio comparison. In some embodiments, the third transmission duration is equal to the first transmission duration.

In yet another aspect, the present disclosure is directed to a method for transmitting packets. The method can include determining, by an access point 106 communicating wirelessly with a plurality of devices 102, that the access point has a first number of bits to transmit to a first device of the plurality of devices. The access point can determine that the access point has a second number of bits to transmit to a second device of the plurality of devices. The access point can determine, based on at least the first number of bits and the second number of bits, that a first packet for the first device has a first transmission duration, and a second packet for the second device has a second transmission duration. The access point can adjust, based on the determination, a transmission power, a number of spatial streams, or a modulation and coding scheme, to transmit a third packet to the first device or the second device over a third transmission duration.

In some embodiments, the access point 106 can determine the third transmission duration based on a larger of: a first ratio between the first number of bits and a first data rate for transmitting the first number of bits to the first device, and a second ratio between the second number of bits and a second data rate for transmitting the second number of bits to the second device. The access point can determine the third transmission duration, the third transmission duration being greater than at least one of: the first transmission duration and the second transmission duration. The access point can adjust one or both of the transmission power and the MCS, based at least on one or both of: a signal-to-noise ratio reported by the first device, and a signal-to-noise ratio reported by the second device.

In still another aspect, this disclosure is directed to a method for transmitting packets. The method can include determining, by a first wireless device communicating wirelessly with a plurality of second devices, that a first packet for a first one of the plurality of second devices has a first transmission duration, and a second packet for a second one of the plurality of devices has a second transmission duration shorter than the first transmission duration. The first wireless device can adjust, based on the determination, a transmission power or a modulation and coding scheme of the first wireless device to transmit the second packet during a third transmission duration. The third transmission duration can be greater than the second transmission duration.

In some embodiments, transmission resources are re-allocated between the first one and the second one of the second devices based at least on one or both of: a signal-to-noise ratio reported by the first one of the second devices, and a signal-to-noise ratio reported by the second one of the second devices. The first wireless device can reduce the transmission power to transmit the second packet, wherein the first wireless device is at least one of a handset, a computer, or an access point, and the second devices are each at least one of a handset, a computer, or an access point. The first wireless device can increase a transmission power of the first wireless device for the first one of the second devices based on the reduction of the transmission power to transmit the second one of the second devices. The first wireless device can compare a signal-to-noise ratio reported by the first one of the second devices to a signal-to-noise ratio reported by the second one of the second devices. The first wireless device can change a modulation and coding scheme to transmit the second packet based at least on the signal-to-noise ratio comparison. The first wireless device can change a MCS for the first one of the second devices based on the signal-to-noise ratio comparison. The third transmission duration is equal to the first transmission duration.

Figure 2A:
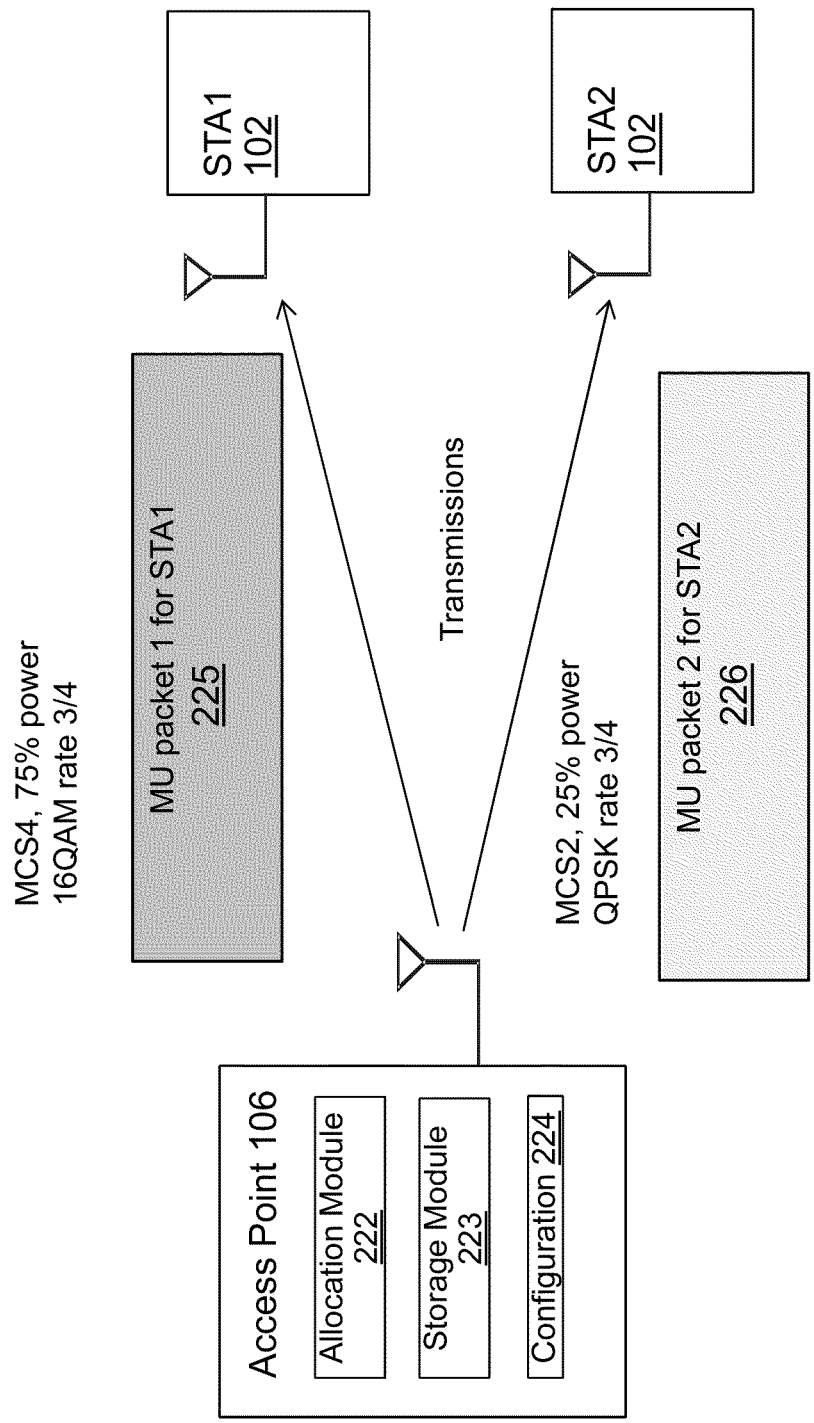
FIG. 2A is a block diagram depicting one embodiment of a system for transmitting packets.

Referring to FIG. 2A, an embodiment of a system for transmitting packets is depicted. In brief overview, the system includes an access point 106 having information to transmit to a plurality of wireless communications devices 102, STAs 102 or users 102 (hereinafter sometimes generally referred to as "devices"). The access point 106 can include an allocation module 222, a storage module 223 and/or a configuration 224. The access point 106 and/or the devices 102 can each include a radio, and can include a transmitter and/or a receiver. The access point can comprise a beamformer, and can include one or more antennas (e.g., phase array antennas). The system can support a MU-MIMO transmission configuration between the access point 106 and the multiple devices/users 102. The access point 106 can have different amounts of information to transmit to each device, which can be relatively constant or variable over time. The access point 106 can predict or estimate the amount of information it expects to transmit to a device (e.g., based on historical records of transmission traffic and trends).

The access point 106 can determine a packet length for each device 102 based on the corresponding amount of information to transmit to each device 102. The access point can determine a packet length for each device based on a data rate assigned to each device. The packet length can refer to an expected/raw size of a data portion for a device, within a MU-MIMO frame (e.g., quantified as a certain number of bits). In some embodiments, the packet length can refer to a duration or time expected or used to transmit an amount of information destined for a device. Some or all of these operations can be performed by an allocation module 222 of the access point.

The allocation module 222 can comprise hardware, or a combination of hardware and software. For example, the allocation module 222 can include any application, program, library, script, task, service, process or any type and form of executable instructions executing on hardware of the access point. In one embodiment, the allocation module comprises a set of executable instructions executing on a core or processor of the access point. The allocation module can include circuitry designed and/or constructed to perform any of the operations and functions described herein. In some embodiments, the allocation module can control transmission of packets or frames to devices. For example, the allocation module can determine/estimate the amount of data for transmission to each device, determine a transmission duration (or packet length) for the devices, and/or to allocate transmission resources between transmissions to the devices. The transmission resources can, for example, include one or more of: transmission power, MCS assignment, the number of spatial streams and antenna selection for each device. The allocation module can use any type and form of statistical or probabilistic algorithms or decision making process to allocate the transmission resources.

In some embodiments, the allocation module 222 comprises firmware executing on the access point 106 hardware. The firmware can operate in a layer of a protocol stack of the access point (e.g., in an upper layer). In certain embodiments, the allocation module operates in the MAC layer, e.g., residing between a lower layer of MAC and a higher layer of MAC. The allocation module can be built or designed to trade off any excess SNR margins from a plurality of devices, by adjusting power and/or MCS between devices to improve overall system capacity while meeting SNR requirements. The allocation module 222 can identify a shorter packet and the associated device. The allocation module 222 can drop the MCS of the device. The allocation module 222 can lengthen the packet to match a packet length of another transmission. The allocation module 222 can trade an excess SNR of the device 102 with a lower MCS. The allocation module 222 can reallocate the number of spatial streams for each device 102 (e.g., station or STA). The allocation module can re-allocate some power for the device to another device.

The allocation module 222 can have access to a configuration 224 of the access point 106. The configuration 224 can include information about assignment/allocation of transmission resources to one or more of the plurality of devices 102. The configuration can be stored in a storage module of the access point. The storage module 223 can comprise one or more interconnected storage devices, such as any embodiment of storage devices 128, 140, 122, described above in connection with FIGS. 1B and 1C. In some embodiments, the allocation module can generate the configuration, for example, by generating values (e.g., transmission power levels) for the configuration. The allocation module can generate an initial configuration or allocation of resources, and can store the initial configuration in the storage module. The allocation module can, for example, allocate or split (e.g., equally split) an available power between the plurality of devices.

In some embodiments, the configuration 224 comprises an allocation of transmission resources for at least some of the plurality of devices. The configuration 224 can include a list, table or other database structure, and can include at least one entry, record or specification for each device. The configuration can comprise a file or a collection of records, stored/maintained in the storage module 223 (e.g., memory). A transmitter or transmit chain of the access point 106 can access or read a portion of the configuration, to process an amount of information for transmission to a corresponding device 102. For example, the transmitter or transmit chain can hash into the configuration for a certain device, to allocate resources for a transmission to that device. The allocation module can update the configuration based on any allocation or re-allocation of transmission resources.

Figure 2B:
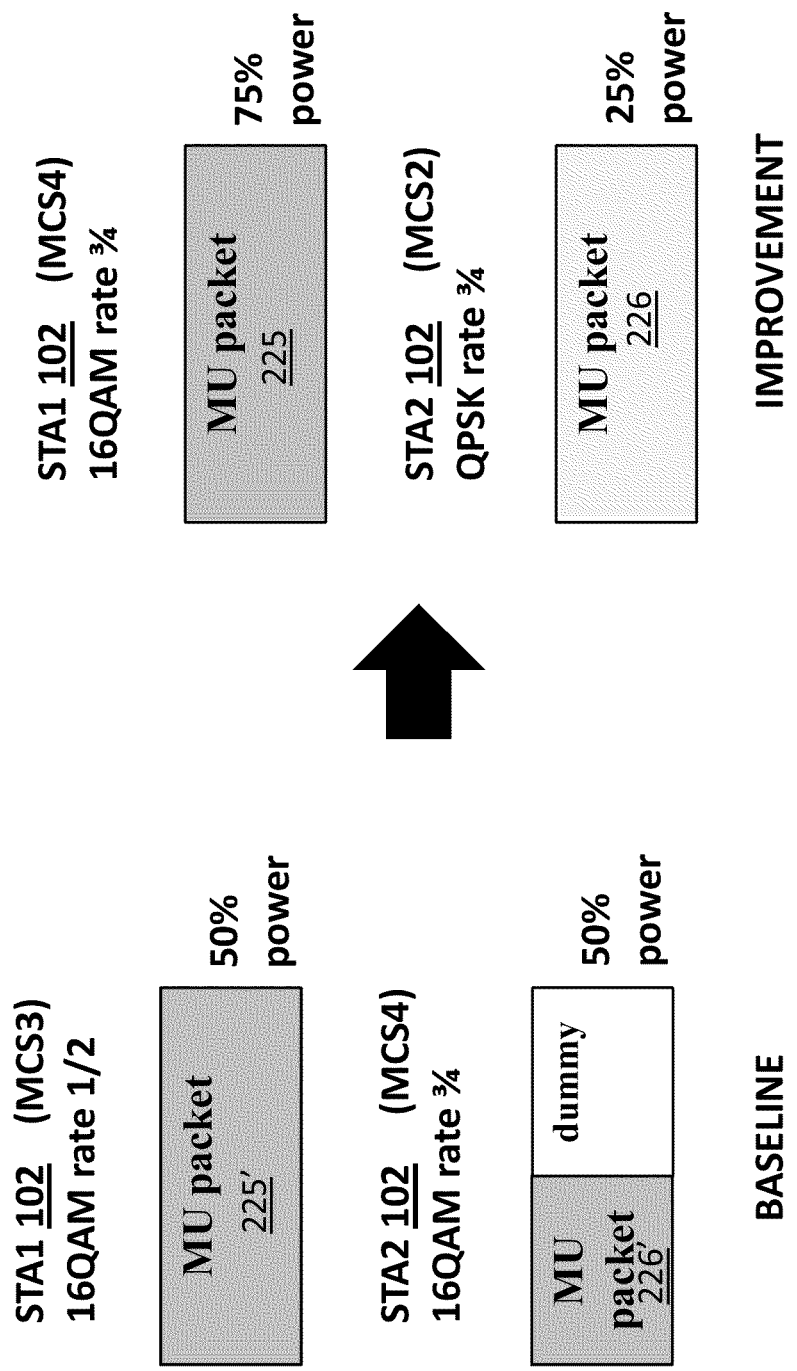
FIG. 2B is a diagram illustrating one embodiment of a method for re-allocation of resources for transmitting packets.

By way of illustration, FIG. 2B depicts an example for re-allocation of transmission resources between devices 102. In this example, the left side of the figure, representing a baseline or initial configuration, shows a shorter packet 226' (for STA2) that is half the size of another packet 225' for another device (STA1'). As an example embodiment, the access point can initially equally allocate or split the transmission power between the two devices (e.g., 50% to each device). An allocation module 222 of the access point can intelligently and/or selectively assign or adjust a transmission power and/or MCS for each device. Based on the size of the packet for STA2 (and/or any excess SNR), the allocation module of the access point can determine to adjust or drop the MCS for STA2 from MCS4 to MCS2 (e.g., instead of padding the shorter packet 226' with dummy data as discussed earlier as an alternative). Excess SNR can represent an amount an estimated/determined SNR is above/over a predetermined or acceptable SNR threshold sufficient or necessary for decoding a transmission from the access point at the receiving device. The MCS adjustment can result in excess SNR, or can increase the amount of any excess SNR already present at baseline for STA2. Excess SNR can represent an amount an estimated/determined SNR is above/over a predetermined or acceptable SNR threshold that is sufficient or necessary for decoding a transmission from the access point at the receiving device.

Excess SNR (or further excess SNR) can be created by the MCS adjustment due to a different SNR requirement or threshold at each MCS (e.g., MCS2 can have a lower SNR requirement than MCS4). Responsive to the MCS adjustment, the access point 106 can effectively double the packet length for STA2 given the modulation scheme applied with the adjustment (e.g., switching from 16QAM rate ¾ to QPSK rate ¾). For example, if the baseline data rate for STA2 is 39 bps, the MCS adjustment can reduce the data rate to 19.5 bps, e.g., effectively "stretching" the packet length of STA2 to match that of STA1. The access point can trade the excess SNR by reducing transmission power to STA2 (e.g., reducing SNR to STA2) and increasing transmission power to STA1 (e.g., increasing SNR to STA1), wherein a total transmission power for the first and second device remains or is maintained at a same, rated or predetermined (e.g., acceptable or ceiling) operational level. In some embodiments, a predictable or corresponding decrease in SNR can be expected based on a decrease in transmission power. For example, a 50% or 3 dB decrease in power (e.g., from 50% to 25% allocation of power) can be expected to translate to a 50% reduction in SNR.

The access point 106 can adjust or increase the MCS for STA1 from MCS3 to MCS4 for example. The corresponding modulation scheme can change from 16QAM rate 1/2 to rate 3/4. The data rate for STA1 can increase, for example, from a baseline rate of, for example, 26 bps, to 39 bps. The allocation module can re-allocate power to STA1 by increasing its allocation from 50% to 75%. A corresponding increase in SNR can be expected based on the increase in transmission power. A 50% or 3 dB increase or bump in power (e.g., from 50% to 75% allocation of power) can be expected to translate to a doubling in SNR in STA1. Accordingly, STA1 can receive a better throughput (e.g., based on the higher data rate and/or increased power). For example, the increased power can compensate for a higher SNR requirement applied by the MCS upgrade or change. The allocation module can select the MCS based on a desired data rate, for example. In some embodiments, the allocation module 222 can adjust a transmission power to a device based on the MCS of that device.

In some embodiments, the allocation module 222 can include a learning engine that monitors or learns actual SNR measurements as compared with predicted SNR results (e.g., based on power adjustments). For example, the learning engine can monitor transmissions of the access point, and can measure any differential in power loading as compared to estimated SNRs in feedback reports from the devices. The learning engine can track such data in a table or other data structure, so that the allocation module can appropriately select power and/or MCS adjustments between devices.

In other embodiments, the allocation module 222 (in addition to or instead of changing the MCS) can adjust the number of spatial streams for each device 102 to more adequately match packet lengths for the packets 225' and 226'. For example, the allocation module 222 can increase the number of spatial streams to decrease the length of the MU packet 225' to more adequately match the length of packet 226'. In another example, the allocation module 222 can decrease the number of spatial streams for packet 226' to more adequately match the length of packet 225'.

Figure 2C:
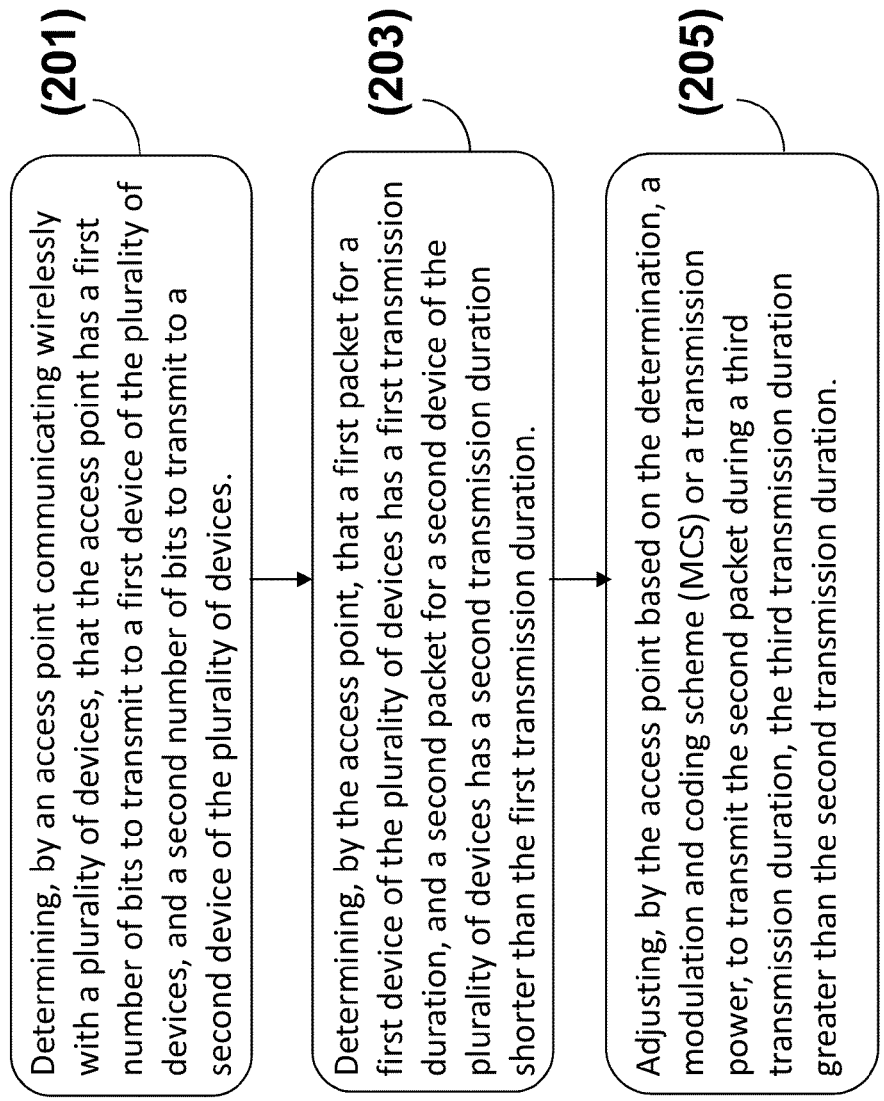
FIG. 2C is a floe diagram of an embodiment of a method for transmitting packets.

Referring now to FIG. 2C, one embodiment of a method for transmitting packets is depicted. The method can include determining, by an access point 106 communicating wirelessly with a plurality of devices 102, that the access point 106 has a first number of bits to transmit to a first device 102 of the plurality of devices 102 (201). The access point 106 can determine that the access point 106 has a second number of bits to transmit to a second device 102 of the plurality of devices 102. The access point 106 can determine that a first packet for a first device 102 of the plurality of devices 102 has a first transmission duration (203). The access point 106 can determine that a second packet for a second device 102 of the plurality of devices 102 has a second transmission duration shorter than the first transmission duration. The access point 106 can adjust, based on the determination, a modulation and coding scheme, a number of spatial streams, or a transmission power, to transmit the second packet during a third transmission duration in (205). The third transmission duration can be greater than the second transmission duration. Some or all of the operations in the method can be performed by an allocation module of the access point 106.

Referring now to (201), and in some embodiments, an access point 106 communicating wirelessly with a plurality of devices 102 can determine that the access point 106 has a number (e.g., a first number) of bits to transmit to a device 102 (e.g., a first device) of the plurality of devices 102. In a MU-MIMO configuration with N devices, users or STAs, for example, the access point can identify or determine an amount of information to transmit to each of the N devices 102, users or STAs (hereinafter sometimes generally referred to as "devices"). For example, the access point 106 can further determine that the access point 106 has a certain number (e.g., a second number) of bits to transmit to another device 102 (e.g., a second device) of the plurality of devices (and so on, if the plurality of devices comprises more than two devices).

The access point 106 can predict or estimate an amount of information for transmission to a device 102, which can be fairly constant or can vary over time. The access point 106 can for example calculate, estimate or otherwise determine from a buffer, data queue, received message or instruction, that there is a particular number of bits of information to send or convey to a certain device 102. The access point 106 can determine (e.g., via an allocation module) based on a destination address or identifier (e.g., IP address or device identifier), that a certain amount or packet of information is destined for a certain device 102. In certain embodiments, the access point 106 can allocate or assign an amount of information to send to one or more of the plurality of devices.

The number of bits for transmission to a particular device 102 can, for example, be based at least on one or more of: data requested by the device 102, a source of the data to be transmitted to the device 102, the amount of data having the device 102 as the specified destination, an identity of a user operating or associated with the device 102, the type of the device 102, or the size of any common portion of data (e.g., omnidirectional portion of preamble of MU frame) that the access point 106 is sending to the plurality of devices 102, for example. The access point 106 can determine that the access point 106 has a certain number of bits to transmit to one or more of the plurality of devices 102. An amount of information to transmit to one device 102 can differ from an amount of information to transmit to another device 102 of the plurality of devices 102. The access point 106 can determine that the access point 106 has a different number of bits to transmit to some of the plurality of devices.

Referring now to (203), and in some embodiments, the access point 106 can determine (e.g., via the allocation module 222) that a first packet for a first device 102 of the plurality of devices 102 has a first transmission duration. The access point can 106 determine that a second packet for a second device 102 of the plurality of devices 102 has a second transmission duration. The second transmission duration can be shorter than the first transmission duration. The access point 106 can determine, based on at least the first number of bits and the second number of bits, that a first packet for the first device 102 has a first transmission duration, and/or that a second packet for the second device 102 has a second transmission duration. For example, the access point 106 can in some embodiments determine a transmission duration based on an amount of data to transmit and a corresponding transmission rate (e.g., a transmission rate based on an assigned MCS). In another example, the access point 106 can in some embodiments determine a transmission duration based on an amount of data to transmit, the number of spatial streams, and a corresponding transmission rate (e.g., a transmission rate based on an assigned MCS).

The transmission rate and/or MCS can be specific to a device 102 or across some or all of the plurality of devices. In some embodiments, the access point 106 includes a configuration that specifies one or more of a transmission power level, a MCS and a transmission rate (e.g., for one or more of the plurality of devices). The access point 106 can maintain or store the configuration in a storage module (e.g., memory) of the access point. The access point 106 can generate or determine an initial configuration that allocates or assigns one or more of a transmission power level, a MCS, a number of spatial streams, and/or a transmission rate for one or more of the plurality of devices 102. By way of illustration, the access point 106 can assign a MCS for transmissions to a device 102, the MCS specifying a transmission rate. In one embodiment, the MCS can include, specify or be associated with a number of spatial streams. In another embodiment, the access point 106 can separately assign the number of spatial streams. The transmission duration can be determined or calculated by dividing an amount of data for transmission to the device 102, with the transmission rate. The transmission rate can be calculated in accordance with number of spatial streams for the data. In certain embodiments, the access point 106 can assign an initial transmission rate to each of the plurality of devices 102, and can determine a transmission duration for each device 102 based on the initial transmission rate.

Referring now to (205), and in some embodiments, the access point 106 can adjust, based on the determination, a modulation and coding scheme, the number of transmission streams, and/or a transmission power, to transmit the second packet during a third transmission duration. The third transmission duration can be greater than the second transmission duration. The third transmission duration can be the same as, or equal to the first transmission duration. The access point 106 can determine (e.g., via an allocation module) the third transmission duration based on the greater of at least the first and the second transmission durations. In some embodiments, the access point 106 can determine the third transmission duration based on a larger of: a first ratio between the first number of bits and a first data rate for transmitting the first number of bits to the first device 102, and a second ratio between the second number of bits and a second data rate for transmitting the second number of bits to the second device 102. The access point 106 can determine or specify the third transmission duration based on (e.g., to be the same as) the largest transmission duration amongst transmission durations determined for the plurality of devices 102. The access point 106 can determine the third transmission duration, the third transmission duration being greater than at least one of: the first transmission duration and the second transmission duration.

The access point 106 can adjust a MCS, the number of spatial streams, and/or a transmission power, to transmit the packet (e.g., second packet 226) during the third transmission duration. The access point 106 can update a configuration to adjust, change, modify or update the MCS, the number of spatial streams, and/or a transmission power. In some embodiments, the access point 106 adjusts one or both of the transmission power and the MCS, based at least on one or both of: a signal-to-noise ratio reported by the first device, and a signal-to-noise ratio reported by the second device. The allocation module 222 can select a different MCS based on a desired data rate for transmitting information to a corresponding device. The allocation module 222 can select a transmission power level based on the MCS (e.g., the updated MCS). In some embodiments, the access point 106 can directly adjust a number of spatial streams or a data rate (instead of via a MCS adjustment) for transmissions to a device 102. In certain embodiments, the access point 106 can adjust a MCS to adjust a data rate of transmission with a device. In certain embodiments, the access point 106 can adjust a number of spatial streams to adjust a data rate of transmission with a device 102. A device 102 can calculate, estimate or otherwise determine a signal-to-noise ratio, e.g., based on a sounding frame (e.g., NDP sounding frame or otherwise) from the access point. The device 102 can report, send and/or include the SNR, or information about the SNR, in a response to the sounding frame.

The access point 106 can receive a plurality of SNR reports (e.g., included in responses to sounding frames) from the plurality of devices 102. The access point 106 can compare the plurality of SNRs across the plurality of devices 102. The comparison can include comparing a reported SNR against a predefined or acceptable threshold (e.g., for the device and/or the access point). For example, the comparison can include comparing a reported SNR against a SNR threshold which can be system-specific, application-specific (e.g., an application/source/network-specific connection with a device 102 via the access point 106), and/or device-specific (e.g., specified by a MCS assigned to a device 102). The comparison can include determining a SNR margin or deficiency relative to a SNR threshold. The comparison can include comparing SNR margins or deficiencies between devices. The comparison can include assigning weights or priority to at least some of the SNRs, and/or SNR margins or deficiencies, between the devices. For example, the access point 106 can compare a signal-to-noise ratio reported by the first device to a signal-to-noise ratio reported by the second device 102 (e.g., including a comparison of SNR margins).

The access point 106 can allocate or re-allocate one or more transmission resources between the plurality of devices 102 (e.g., between at least the first device 102 and the second device 102). The access point 106 can allocate or re-allocate one or more transmission resources between the plurality of devices 102 based on packet lengths of the devices (e.g., the amount of data to be transmitted to each device in the MU-MIMO frame). The access point 106 can allocate or re-allocate one or more transmission resources to each of the devices 102. The access point 106 can re-allocate one or more transmission resources to some of the devices 102. The access point 106 can allocate or re-allocate the one or more transmission resources based at least on one or both of: a signal-to-noise ratio reported by the first device, and a signal-to-noise ratio reported by the second device. The access point 106 can allocate or re-allocate one or more transmission resources based on SNRs reported by each device. The access point 106 can allocate or re-allocate one or more transmission resources by trading any excess SNR between the devices. The allocation or re-allocation of one or more transmission resources can include adjustment of a MCS, the number of spatial streams, and/or a transmission power to at least one device 102.

In some embodiments, the adjustment can include changing from a first MCS (e.g., an initial or default MCS) to a second MCS (e.g., different, lower or higher MCS). By way of illustration, and in some embodiments for a device 102 determined to have a shorter packet 226' or transmission duration, the access point 106 can change a first MCS for the device to a different/second MCS (e.g., a lower MCS). The second MCS can be determined or selected to provide a desired transmission data rate (e.g., to adjust or lengthen the packet of a device 102). The second MCS can be determined or selected to adjust a SNR with the device (e.g., relative to a threshold and/or a SNR with another device 102). For example, the MCS can trade any excess SNR with one or more devices 102 by adjusting the MCS for one or more of these devices 102.

Adjusting to the second MCS can result in or translate to a lower or higher SNR with the corresponding device. The second MCS can support a data rate that is lower or higher than that supported by the first MCS. The higher or lower data rate can translate to an adjustment in the SNR with the corresponding device. The access point 106 can change a MCS for a device 102 (e.g., the first or second device) based on the signal-to-noise ratio comparison. The access point 106 can change a MCS for a device 102 based on a SNR reported that is above or below a predefined or acceptable threshold (e.g., for the device based on the assigned MCS). The access point 106 can change a MCS to transmit a packet (e.g., the second or first packet) based at least on the determined packet length. The access point 106 can change a MCS to transmit a packet (e.g., the second or first packet) based at least on the signal-to-noise ratio comparison.

In certain embodiments, the access point 106 adjusts a transmission power of the access point 106 for a device 102. The access point 106 can, for example, reduce (or increase) a transmission power of the access point for the device. The access point 106 can, for example, reduce (or increase) the transmission power to transmit the packet. The access point 106 can adjust a transmission power of the access point for a device based on an assigned MCS. The access point 106 can adjust a transmission power of the access point for a device based on a signal-to-noise ratio margin or deficiency, e.g., relative to a predefined or acceptable threshold (e.g., for the device and/or the access point). The access point 106 can adjust a transmission power of the access point 106 for a device 102 based at least on the signal-to-noise ratio comparison. The access point 106 can adjust a transmission power of the access point 106 for a device based on at least one SNR report. By way of illustration, the access point 106 can reduce the transmission power for the second device 102, based on a higher SNR reported by the second device 102 (e.g., relative to a SNR for the first device 102). The access point 106 can reduce the transmission power for the second device 102, based on a SNR reported by the second device 102 that is better than a predefined or acceptable threshold (e.g., specified by a MCS assigned for the second device 102). The access point 106 can increase or re-allocate a transmission power of the access point 106 for the first device 102 based on the reduction of the transmission power for the second device 102. The access point can increase a transmission power of the access point 106 for the first device 102 based on the reduction of the transmission power to transmit the second packet. In some embodiments, an access point 106 can adjust a transmission power to a device without adjusting that for another device.

In some embodiments, the access point 106 can maintain the transmission power and/or MCS of the access point 106 for one or more devices 102, e.g., based on the SNR report(s). In some cases or scenarios, the access point 106 can determine that there is no excess transmission power that can be re-allocated (e.g., from a transmission to another device) to a transmission for a certain device 102. The access point 106 can determine that there are no MCS adjustments that can be made (e.g., from a transmission to another device) to a transmission for a certain device 102 (e.g., to provide a desired packet length and/or meet a SNR requirement). For example, the access point 106 can determine that there is insufficient SNR margin(s), if any, to trade transmission power and/or MCS between devices 102.

In certain embodiments, the access point 106 can use successive or additional sounding frames to obtain SNR reports/updates for further/incremental adjustment of transmission resources. For example, upon determination of the third transmission duration, the access point can use one or more sounding frames over time to elicit SNR information, which can include updated SNR information over time. Such a feedback mechanism can be incorporated into an initial setup phase for a MU-MIMO system, and/or as part of MU-MIMO packet communications. It is contemplated that the access point can apply different types and/or extents of adjustments, if any, with each SNR update.

Some operations described in relation to (202), (203), and (205) can be performed by wireless devices 102 (e.g., STAs) in one embodiment. Devices 102 can communicate with each other, another wireless device, or access point 106 using adjustments to transmission characteristics to achieve equal packet lengths. For example, devices 102 capable of multiunit communication can include allocation module 222, storage module 223, and configuration 224 discussed in FIG. 2A to effect adjustment of MCS, the number of spatial streams, and transmission power and equal or more equal packet length transmissions as described herein according to one embodiment.

Although the disclosure can reference one or more "users", such "users" can refer to user-associated devices or STAs, for example, consistent with the terms "user" and "multi-user" typically used in the context of a multi-user multiple-input and multiple-output environment.

Although examples of communications systems described above can include STAs and APs operating according to an 802.11 standard, it should be understood that embodiments of the systems and methods described can operate according to other standards and use wireless communications devices other than devices being used as STAs and APs. For example, multiple unit communications interfaces associated with cellular networks, satellite communications, vehicle communication networks, and other non-802.11 wireless networks can utilize the systems and methods described herein to achieve improved overall capacity without departing from the scope of the systems and methods described herein.

It should be noted that certain passages of this disclosure can reference terms such as "first" and "second" in connection with devices, number of bits, transmission durations, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use embodiments of the present invention, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for transmitting packets, the method comprising:
    determining, by an access point communicating wirelessly with a plurality of devices, that a first packet for a first device of the plurality of devices has a first transmission duration, and a second packet for a second device of the plurality of devices has a second transmission duration shorter than the first transmission duration;
    adjusting, by the access point according to the determination, a modulation and coding scheme (MCS) to transmit the second packet with a third transmission duration, the third transmission duration being greater than the second transmission duration; and
    reducing a transmission power of the access point for the second packet based at least on a comparison of a signal-to-noise ratio reported by the first device to a signal-to-noise ratio reported by the second device.

2. The method of claim 1, further comprising re-allocating transmission resources between the first device and the second device based at least on one or both of: a signal-to-noise ratio reported by the first device, and a signal-to-noise ratio reported by the second device.

3. The method of claim 1, further comprising changing from a first MCS to a second MCS, the second MCS supporting a data rate that is lower than that supported by the first MCS.

4. The method of claim 1, further comprising adjusting a number of spatial streams of the access point to transmit the second packet.

5. The method of claim 1, further comprising receiving, by the access point, the signal-to-noise ratio reported by the first device and the signal-to-noise ratio reported by the second device.

6. The method of claim 1, further comprising increasing a transmission power of the access point for the first device based on the transmission power reduction for the second device, wherein a total transmission power for the first and second device remains at a predetermined level.

7. The method of claim 1, further comprising changing a MCS for the first device based on the signal-to-noise ratio comparison.

8. The method of claim 1, wherein the third transmission duration is equal to the first transmission duration.

9. A method for transmitting packets, the method comprising:
    determining, by a first wireless device communicating wirelessly with a plurality of second devices, that a first packet for a first one of the plurality of second devices has a first transmission duration, and a second packet for a second one of the plurality of devices has a second transmission duration shorter than the first transmission duration;
    adjusting, by the first wireless device according to the determination, a transmission power, a number of spatial streams, or a modulation and coding scheme of the first wireless device to transmit the second packet during a third transmission duration, the third transmission duration being greater than the second transmission duration; and
    reducing the transmission power to transmit the second packet, wherein the first wireless device is at least one of a handset, a computer, or an access point, and the second devices are each at least one of a handset, a computer, or an access point.

10. The method of claim 9, further comprising re-allocating transmission resources between the first one and the second one of the second devices based at least on one or both of: a signal-to-noise ratio reported by the first one of the second devices, and a signal-to-noise ratio reported by the second one of the second devices.

11. The method of claim 9, further comprising adjusting the MCS of the first wireless device to transmit the second packet.

12. The method of claim 9, further comprising increasing a transmission power of the first wireless device for the first one of the second devices based on the reduction of the transmission power to transmit the second one of the second devices.

13. The method of claim 9, further comprising comparing a signal-to-noise ratio reported by the first one of the second devices to a signal-to-noise ratio reported by the second one of the second devices.

14. The method of claim 13, further comprising changing a modulation and coding scheme (MCS) to transmit the second packet based at least on the signal-to-noise ratio comparison.

15. The method of claim 13, further comprising changing a MCS for the first one of the second devices based on the signal-to-noise ratio comparison.

16. The method of claim 9, wherein the third transmission duration is equal to the first transmission duration.

17. A method for transmitting packets, the method comprising:
 determining, by an access point communicating wirelessly with a plurality of devices, that the access point has a first number of bits to transmit to a first device of the plurality of devices, and a second number of bits to transmit to a second device of the plurality of devices;
 determining, by the access point based on at least the first number of bits and the second number of bits, that a first packet for the first device has a first transmission duration, and a second packet for the second device has a second transmission duration;
 adjusting, by the access point according to the determination, a transmission power, a number of spatial streams, or a modulation and coding scheme (MCS), to transmit a third packet to the first device or the second device over a third transmission duration; and
 reducing the transmission power to transmit the second packet, wherein the first wireless device is at least one of a handset, a computer, or an access point, and the second devices are each at least one of a handset, a computer, or an access point.

18. The method of claim 17, further comprising determining the third transmission duration based on a larger of: a first ratio between the first number of bits and a first data rate for transmitting the first number of bits to the first device, and a second ratio between the second number of bits and a second data rate for transmitting the second number of bits to the second device.

19. The method of claim 18, comprising determining the third transmission duration, the third transmission duration being greater than at least one of: the first transmission duration and the second transmission duration.

20. The method of claim 17, further comprising adjusting one or both of the transmission power and the MCS, based at least on one or both of: a signal-to-noise ratio reported by the first device, and a signal-to-noise ratio reported by the second device.

* * * * *